Figure 1:
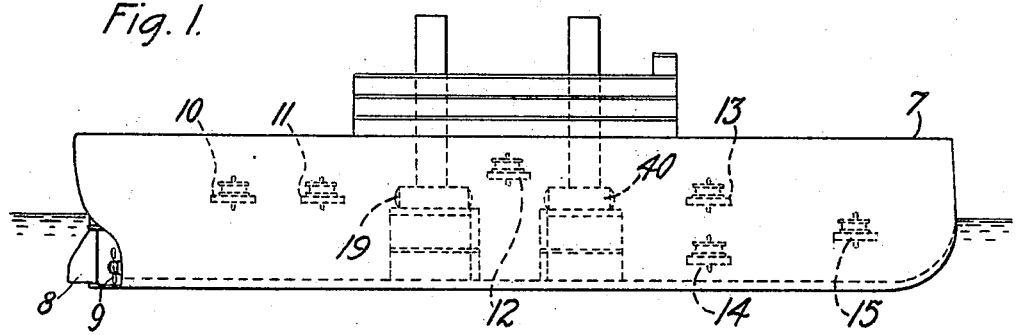

A. McL. NICOLSON.
METHOD AND APPARATUS FOR STEERING VESSELS.
APPLICATION FILED NOV. 29, 1920.

1,392,787.

Patented Oct. 4, 1921.

Inventor:
Alex. McL. Nicolson.

UNITED STATES PATENT OFFICE.

ALEXANDER McLEAN NICOLSON, OF HILLSDALE, NEW JERSEY.

METHOD AND APPARATUS FOR STEERING VESSELS.

1,392,787.

Specification of Letters Patent.

Patented Oct. 4, 1921.

Application filed November 29, 1920. Serial No. 427,230.

*To all whom it may concern:*

Be it known that I, ALEXANDER McLEAN NICOLSON, a subject of the King of Great Britain, residing at Hillsdale, in the county of Bergen and the State of New Jersey, have invented new and useful Improvements in Methods and Apparatus for Steering Vessels, of which the following is a full, clear, concise, and exact description.

This invention relates to apparatus for steering vessels and more particularly it relates to means and methods for steering a vessel under circumstances when the vessel is not readily responsive to the helm.

This invention is related to the invention in steering methods and apparatus described in my copending application, Serial No. 207,479, filed Dec. 17, 1917.

In accordance with the disclosure in the above mentioned application steering is accomplished by storing up rotational energies of opposite senses in the plane in which the turning of the vessel is desired and by transforming the desired part of the rotational energy into rotational energy of the vessel, so as to turn the vessel in the desired sense. The specific apparatus comprises flywheels rotating in opposite directions and breaking means to be applied to the wheels when steering is desired.

In accordance with the particular form of the invention claimed in this application, however, the method of steering the vessel is accomplished by preferably having a flywheel normally at rest and by applying energy to rotate the flywheel in the opposite direction in which steering is desired. Thus with the flywheel at rest steering in a clock-wise direction may be accomplished by applying energy to rotate the flywheel in a counter clock-wise direction. After the desired change in the position of the vessel has been attained the source of rotational energy is cut off and the flywheel may be brought again to its normal condition of rest. The return to the condition of rest may be aided by braking the flywheel, but care should be taken that the return to zero rotation is produced without returning the vessel at the same time to its original position, unless, of course, it is desired to steer the vessel again in the original direction. The tendency of the braking action to turn the vessel may be substantially nullified by helm compensation, that is, by turning the ordinary rudder or other steering mechanism so as to tend to turn the vessel an equal and opposite amount from that produced by the braking action.

The essential element of this invention as above described comprises employing the same flywheel for producing both clockwise and counter clock-wise changes in the direction of a vessel. Although it is preferable to have the flywheel normally at rest, such a condition is not necessary since the flywheel may be normally rotated at a desired speed in a counter clock-wise direction, for example, and steering in a counter clock-wise direction may be obtained by braking the flywheel; while steering in a clock-wise direction may be obtained by increasing the speed of the wheel.

In many cases it may be found desirable to employ a plurality of flywheels distributed throughout the vessel instead of single flywheel centrally located. This will produce a more uniform stress on the structure of the vessel when the speed of the flywheels is suddenly increased or decreased.

Figure 2:
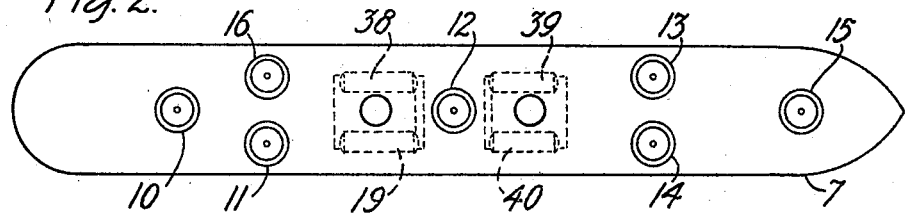

This invention will be better understood by reference to the following detailed description taken in connection with the accompanying drawings, in which Figure 1 represents an embodiment of this invention illustrated in connection with a ship; Fig. 2 is a top view of the same in plan; and Fig. 3 illustrates how the desired changes in rotational energy of the flywheels may be obtained.

Referring more particularly to Fig. 1, 7 is a ship having the ordinary steering means or rudder 8 and propeller 9 fastened to the stern. In accordance with this invention auxiliary steering apparatus is provided within the hull of the vessel and comprises a plurality of flywheels 10 to 16 inclusive, each of which is capable of being rotated in a plane vertical to the plane of the drawing by some suitable means such as that shown in more detail in Fig. 3.

Figure 3:
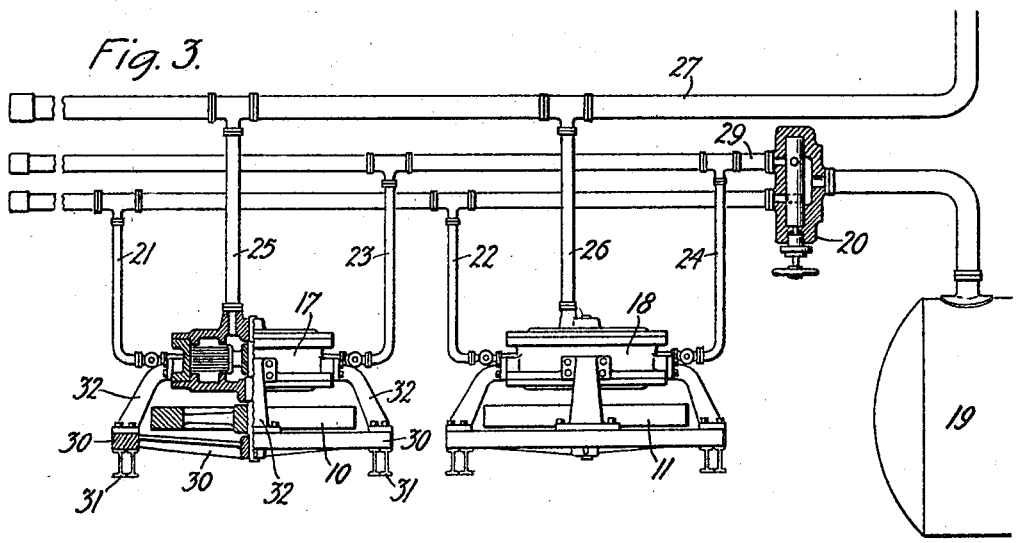

In Fig. 3 the flywheels 10 and 11 are shown mounted on axles common to the steam turbines 17 and 18, respectively. These turbines may be of the Tesla bladeless type, for example, as described in detail on page 498 of Gebhardt's book on *Steam Power Plant Engineering*, (1917 edition). 19 is a steam boiler which may be one of the boilers, 19, 38, 39 and 40, used ordinarily in propelling the ship, and shown in Fig. 2. This boiler, 19, may through a regulating cock, 20, supply steam to turbines 17 and 18 through pipes 21 and 22, respectively, for producing a rotation of the flywheels in one direction and through pipes 23 and 24 for producing a rotation in the opposite direction. In either case the steam is exhausted through pipes 25 and 26 to the main exhaust pipe 27. Controlling cock 20 is shown in the drawing as set for supplying steam to the turbines through pipes 21 and 22. When it is desired to supply steam through pipes 23 and 24 cock 20 should be turned until steam is allowed to pass into pipe 29.

Turbines 17 and 18, and flywheels 10 and 11, may be supported in any suitable manner. Flywheel 10 is shown supported by a plurality of supporting members 30 which are fastened to a part of the framework 31 of the ship. Additional support for the turbine 17 is provided by the arms 32 which are also fastened to the framework of the vessel. Similar supports are provided for flywheel 11 and turbine 18.

It is to be understood that the other flywheels may be driven in a similar manner as just described for wheels 10 and 11.

Fig. 2 is a plan view of Fig. 1 and shows how the flywheels 10 to 15 inclusive may be distributed throughout the ship in order to equalize the strains produced by their acceleration or braking.

In many cases, the center of mass of a vessel is situated somewhat to the rear of the longitudinal center of the vessel. It may be desirable to make use of this condition in combination with the internal steering means here described; for, it is found that whereas a rudder in steering has the undesirable feature of causing a vessel to keel over or lean away from the center of curvature of the path of the vessel, the spinning wheels on the other hand, will cause the vessel to bank toward the center of curvature, provided that the center of mass of the vessel is situated, as aforementioned, between the stem and the longitudinal center of the vessel. This advantageous combination is therefore essential when it is desired to turn the ship rapidly to avoid collision with obstacles, for example, or to control a warship which may be top heavy with her guns.

The total weight of the flywheels relative to the weight of the ship will depend, of course, upon how rapidly it may be desired to turn the vessel and also upon how much acceleration can be given to them by the stored up energy in the boilers. The amount of rotational energy developed will depend upon the weight and the square of the velocity. Excessive velocities in flywheels are objectionable, however, so that the velocity factor is limited to some degree. In general, however, it will be found that sufficient angular velocity may be reached by flywheels having a total weight even less than one per cent. of the total weight of the vessel.

The method of operation of this invention may now be explained as follows:

Assume that all the flywheels are at rest and that it is desired to turn the ship 7 in a clockwise direction. Steam is applied to one or more of the turbines to turn the flywheels in a counter clockwise direction. The amount of turning resulting therefrom will depend, of course, upon the mass and the acceleration of the flywheels so that if a sharp turn is desired, a large amount of power should be applied to the turbines. As soon as the ship has been turned through the proper angle the power is shut off and the wheels may be allowed to run free or caused to come to rest. Any tendency of the ship to change its course while the velocity of the flywheels is approaching zero may be counteracted by helm compensation. It is evident that the return to zero velocity may be hastened by suitable braking means, which may be accomplished, for example, by directing the steam into the turbines in such a direction as to oppose the motion of the wheels. This, of course, is on the assumption that it is desired to maintain constant the direction of the ship while the wheels are returning to zero speed. If before they are at rest it should be desired to turn the ship in a counter clockwise direction, the braking may be acomplished rapidly so as to produce the desired turning. On the contrary, if it should be desired to turn the vessel farther in a clockwise direction the wheels should be speeded up in a counter clockwise direction, the same direction in which they are already rotating. If, for example, two wheels were brought to the maximum allowable speed and it is desired to turn the vessel still more in the same direction it was turned by the rotating flywheels, it is obvious that one or more of the remaining flywheels may be speeded up in order to produce the desired effect.

If desired, of course, all the wheels distributed throughout the vessel may be employed simultaneously for steering either in a clockwise or counter clockwise direction, thereby reducing the stress in the vessel. Turning in one direction would be accomplished by accelerating the speed and turning in the opposite direction would be accomplished by braking or otherwise retarding their rotational motion, so that steering in both directions is accomplished through the intermediary of the same flywheels. Another possible modification of this invention is to have all the wheels normally rotating some in a clockwise and some in a counter clockwise direction and steering in one direction by simultaneously braking the counter clockwise wheels and accelerating the clockwise wheels and steering in the opposite direction by simultaneously accelerating those rotating in a counter clockwise direction and braking those rotating in a clockwise direction. Still other modifications will be apparent to those skilled in the art.

It is obvious that this invention is not limited to any particular number of flywheels. It is also obvious that this invention is not limited to the steering of ships, but may be applied to any type of vessel, such as an airplane, a submarine or other crafts or bodies that require steering in one or more planes.

What is claimed is:

1. The method of steering a vessel in a given plane which comprises developing rotational energy in a flywheel for steering in either a clockwise or counter clockwise direction in said plane.

2. The method of steering a vessel in a given plane which comprises developing rotational energy in a flywheel for steering in a clockwise direction, reducing said rotational energy to zero without producing a substantial change in the direction of said vessel, and developing rotational energy in said flywheel for steering in a counter clockwise direction.

3. The method of steering a vessel in a given plane which comprises rotating a flywheel in a clockwise direction to produce a counter clockwise turning of said vessel, and rotating said flywheel in a counter clockwise direction to produce a clockwise turning of said vessel.

4. The method of steering a vessel in a given plane which comprises producing an acceleration in the clockwise rotational motion of a flywheel for steering in one direction, and subsequently producing an acceleration in the counter clockwise rotational motion of said flywheel to produce steering in an opposite direction.

5. The method of steering a vessel in a given plane which comprises rotating a flywheel in a clockwise direction to produce a counter clockwise turning of said vessel, reducing said rotational energy to zero, while preventing, by helm compensation, substantial changes in the direction of said vessel, and subsequently rotating said flywheel in the opposite direction to produce an opposite turning of said vessel.

6. A steering apparatus for a vessel comprising a flywheel and means for rotating said flywheel in either direction when steering is desired.

7. Apparatus for steering a vessel comprising a flywheel, a steam turbine for rotating said flywheel, and means for supplying steam to rotate said turbine at times in one direction and at other times in the opposite direction whereby the vessel may be steered.

8. The combination with a vessel having a rudder of auxiliary steering means for steering said vessel when said vessel is not readily responsive to said rudder, said auxiliary means comprising a flywheel lying in the plane in which steering is desired and means for rotating said flywheel in either direction.

9. Apparatus for steering a vessel comprising means for causing said vessel to lean toward the center of curvature of the path of said vessel when said vessel is being steered.

10. Means comprising a rotating flywheel for steering a vessel which has its center of mass located between the longitudinal center of said vessel and the stern of said vessel.

11. The combination of a vessel and means for steering said vessel, said vessel having its center of mass, so disposed with respect to the longitudinal center of said vessel that said vessel leans toward center of curvature of the path of said vessel when said vessel is being steered.

12. In combination, a vessel and internal steering means for said vessel, said vessel having its center of mass between the longitudinal center of the vessel and the stern of the vessel.

In witness whereof, I hereunto subscribe my name this 26 day of November, A. D. 1920.

ALEXANDER McLEAN NICOLSON.